UNITED STATES PATENT OFFICE.

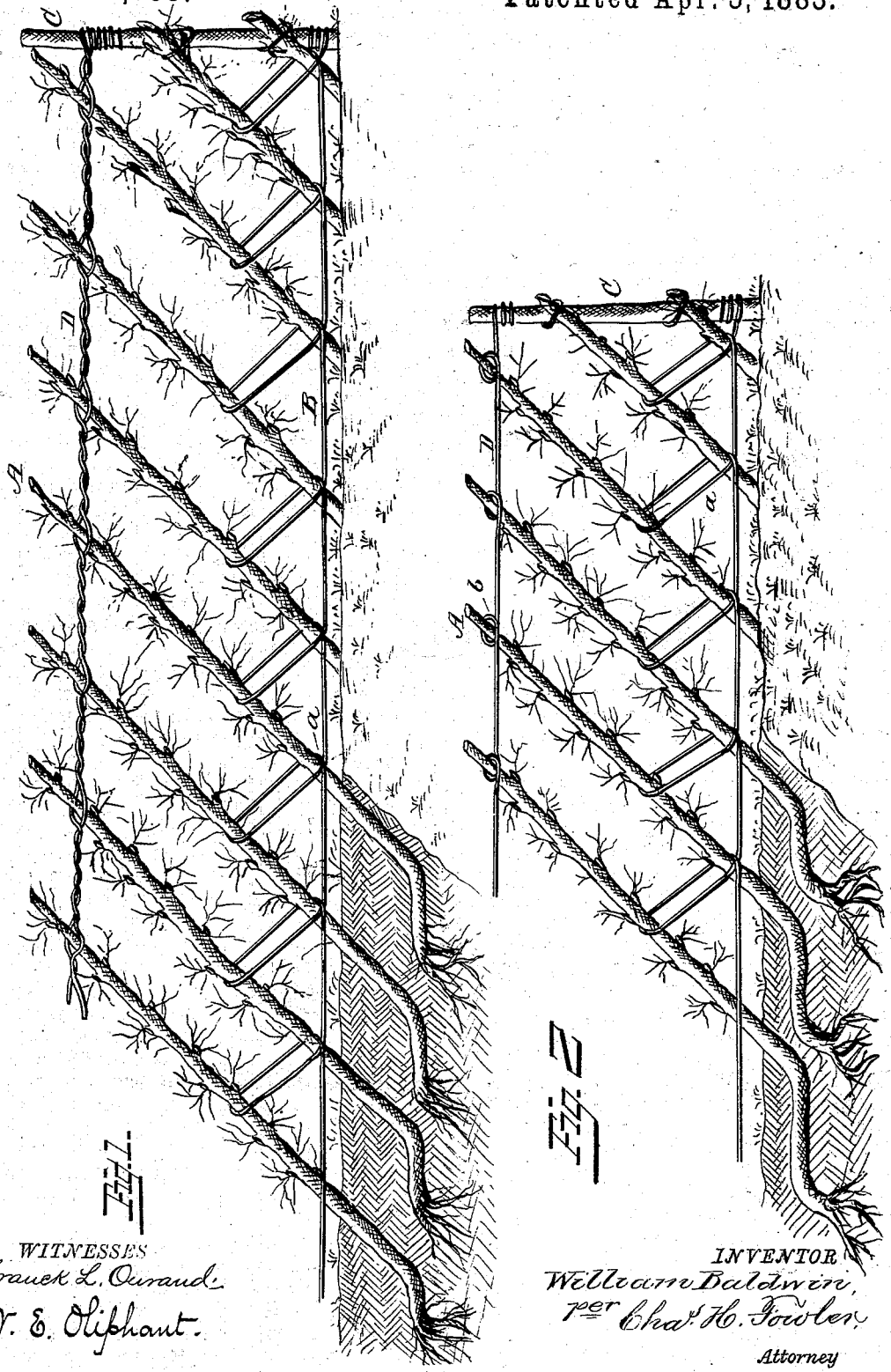

WILLIAM BALDWIN, OF MARION, INDIANA.

PLASHED FENCE.

SPECIFICATION forming part of Letters Patent No. 274,895, dated April 3, 1883.

Application filed November 20, 1882. (No model.)

*To all whom it may concern:*

Be it known that I, WILLIAM BALDWIN, a citizen of the United States, residing at Marion, in the county of Grant and State of Indiana, have invented certain new and useful Improvements in Plashed Fences; and I do hereby declare that the following is a full, clear, and exact description of the same, reference being had to the annexed drawings, making a part of this specification, and to the letters and figures of reference marked thereon.

Figure 1 of the drawings is a side elevation of my invention, and Fig. 2 a similar view, showing a modification in the manner of plashing the tops of the twigs or plants.

The present invention is designed as an improvement on my former patents of February 28 and August 22, 1882, and numbered, respectively, 254,187 and 263,094, and refers more particularly to that class of fences in which the plants are plashed together both at the top and bottom by continuous lines of wire.

Previous to my invention it was common to plash the top and bottom of the plants by the employment of continuous horizontal lines of wire, either connected to the plants at both top and bottom by nails or staples or using two strands of wire to form the line twisted together or interweaving the strands with the plants. It was also common to plash the fences by the employment of a continuous line of wire wrapped around two or more of the plants in the ordinary manner—that is to say, the wire being wound around the plants and extending from one to the other without the wire crossing or lapping itself.

The object of my invention is an improvement in the manner of plashing hedge-fences shown and described in my former patents, and also the manner of plashing above referred to; and it consists in dispensing with the twist in the loops, and at the same time not affecting their strength or effectiveness in holding the plants in position, which, in connection with the means used for plashing the upper ends or tops of the plants, forms a superior fence, both in strength and durability, without danger of injury to the plants.

The invention consists in the manner of constructing the loops at the lower ends or base of the plants in connection with means employed for plashing the tops or upper ends thereof, substantially as shown in the drawings, and hereinafter described and claimed.

In the accompanying drawings, A represents the plants or twigs, which are preferably planted in the manner shown and described in my patent of August 22, 1882, No. 263,094, with the exception that in this instance the heel of the root is dropped down deeper into the ground, causing nearly the entire root to lie horizontally a considerable distance below the surface, and the dirt firmly packed thereon to hold them in their proper position and relieve the strain upon the plashed material to prevent it from injuring the plants by chafing or cutting. By this manner of planting the canes or twigs above the ground are caused to assume a position at an angle of about forty-five degrees, and when sufficiently grown are trimmed, topped, and plashed in the following manner: The wire, cord, or other flexible material, as shown at B, instead of simply winding it around two or more of the plants, as heretofore, is carried from the post or stake C, to which it is attached at one end, to the first plant, and then is passed up over the second plant, and then down behind the first plant to cross itself, as shown at *a*, which operation is continued along the entire fence, the line of the plashed material between the plants being but a little way above the surface of the ground to prevent small pigs and fowls from passing through at the bottom of the fence.

The advantage of the above-described manner of constructing the loop is that it does away with the twist in the loops shown and described in my former patents, thus economizing the material used, rendering the loop more elastic and yielding to the plants or twigs in case of storms, thereby removing the danger of the wire or cord cutting or otherwise injuring them, and admitting of the fence being plashed in a much shorter time, and with less trouble.

The manner of plashing the fence also differs materially from the usual custom of winding the wire or cord around two or more of the plants, as hereinbefore referred to, in that there is no actual loop formed, there being no crossing or lapping of the wire upon itself, as in my invention, and therefore the plants are not held firmly in position. It will be noticed that the point at which the wire laps or crosses itself is at the lower end or extremity of the loop, thereby forming a continuous horizontal line of wire extending the entire length of the fence near the surface of the ground, which could not be the case were the wire simply wound around the plants in an ordinary manner.

For plashing the upper portion of the fence I prefer to use a single strand of wire or cord, D, secured at one end to the post or stake C, and looping said strand around the upper end of each plant, as shown in Fig. 2, the loop $b$ taking in a single plant instead of two plants, as in the loops at the bottom or lower end of the fence.

Having now fully described my invention, what I claim as new, and desire to secure by Letters Patent, is—

1. In a hedge-fence formed substantially as described, the fastening at its base, consisting of a continuous wire or cord extending from end to end of the fence and formed into untwisted loops, as shown, each of which embraces two or more of the plants, the wire or cord of each loop crossing or lapping itself at the lower end or extremity thereof, substantially as and for the purpose set forth.

2. In a hedge-fence, the combination, with a fastening at the top or upper ends of the plants, of the fastenings at the base thereof, consisting of a continuous wire or cord formed into untwisted loops, each of which embraces two or more of the plants, the wire or cord of each loop crossing or lapping itself at the lower end or extremity thereof, substantially as and for the purpose specified.

3. A fastening for both the top and bottom of a hedge-fence, consisting of two single strands of wire or cord extending from end to end of the fence, the upper one of said strands being formed into untwisted loops to embrace a single plant, and the lower one formed into untwisted loops, each of which embraces two or more of the plants, the wire or cord of each loop crossing or lapping itself at the lower extremity or end thereof, substantially as and for the purpose set forth.

In testimony that I claim the above I have hereunto subscribed my name in the presence of two witnesses.

WILLIAM BALDWIN.

Witnesses:
L. D. BALDWIN,
CHAS. RATLIFF.